Figure 1:
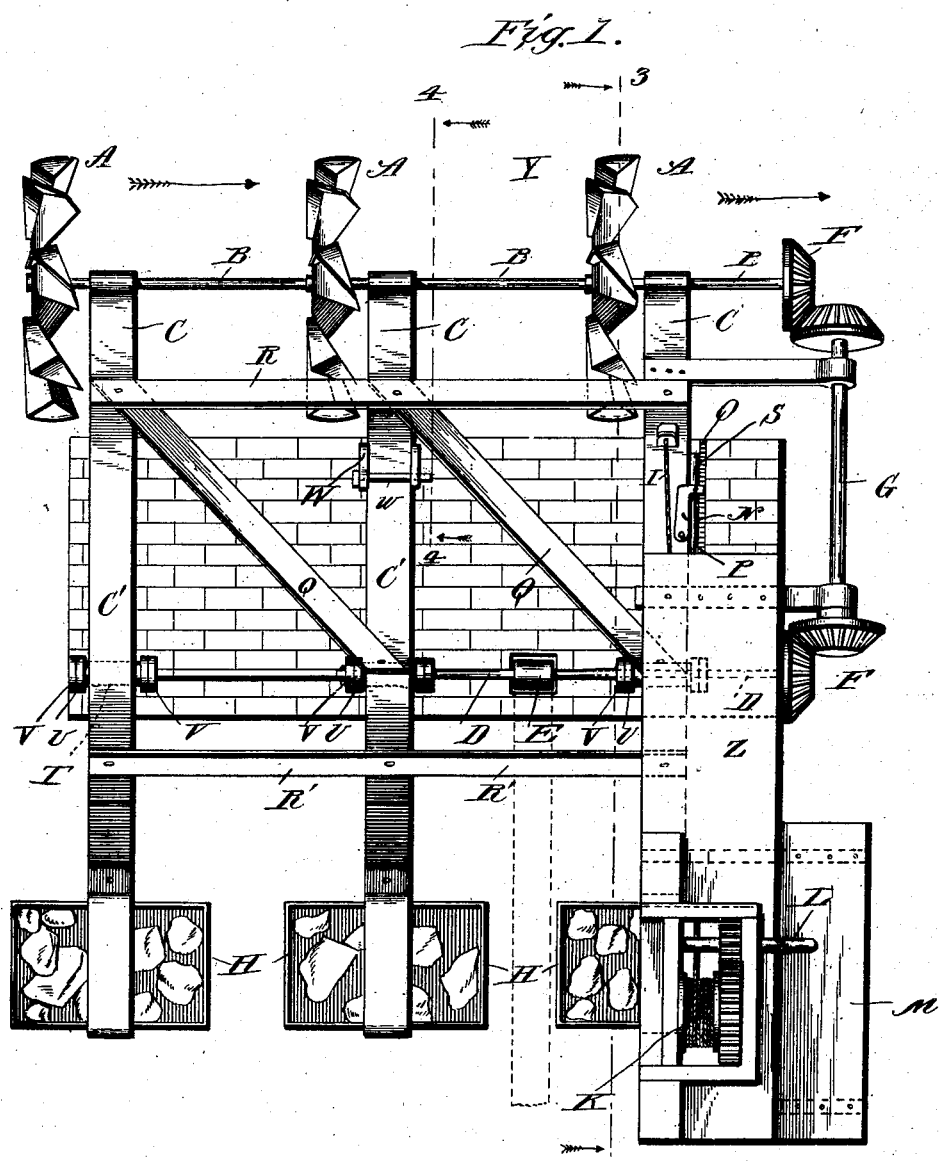

No. 737,256. PATENTED AUG. 25, 1903.
T. A. MacDONALD.
MOTOR DRIVEN BY WATER CURRENTS.
APPLICATION FILED OCT. 4, 1902.
NO MODEL. 3 SHEETS—SHEET 1.

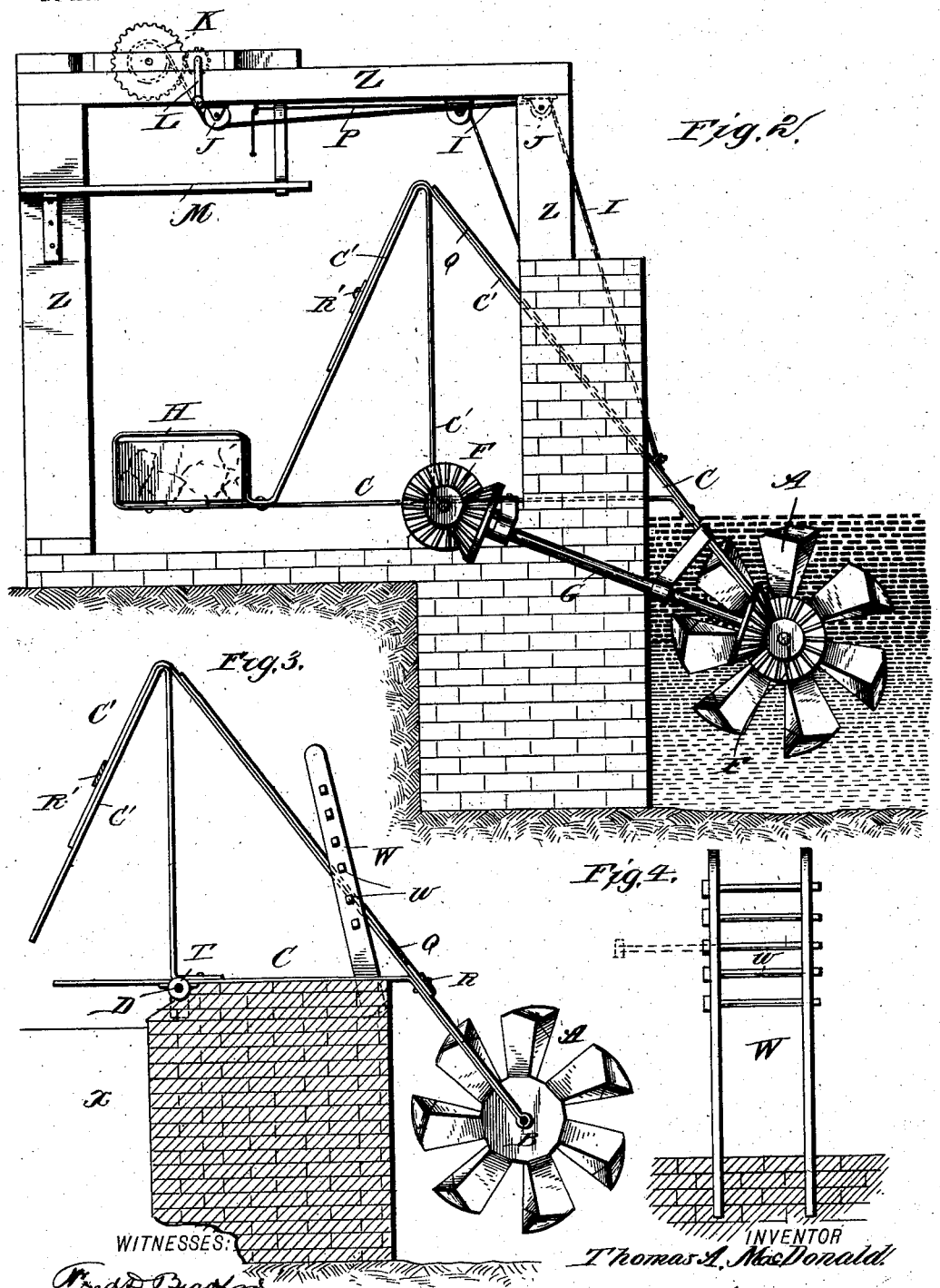

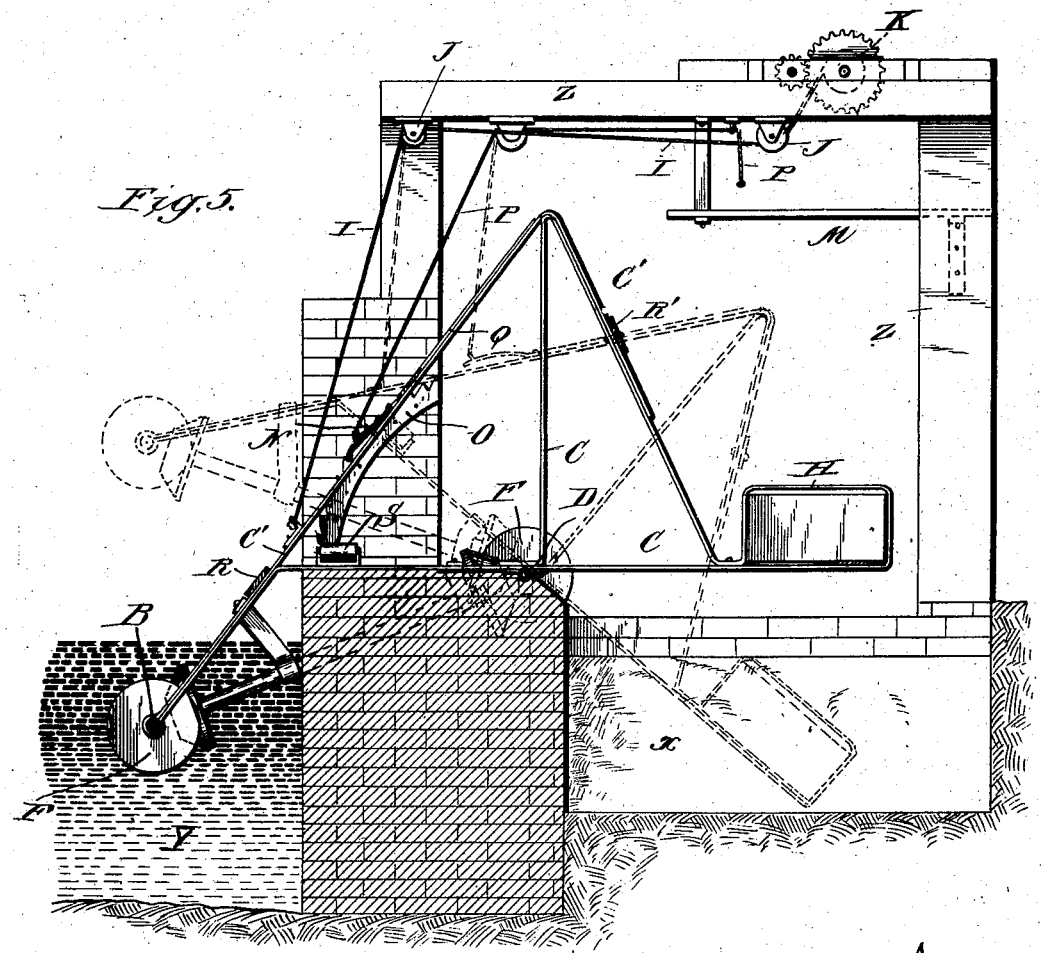
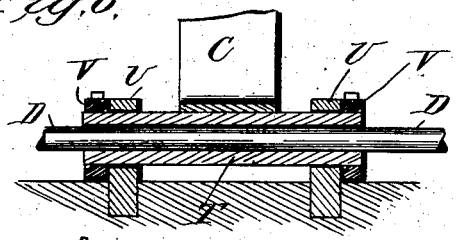
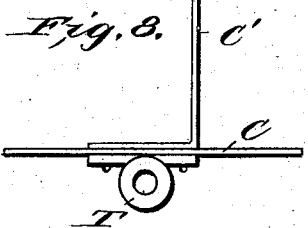
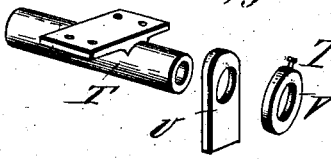

No. 737,256. Patented August 25, 1903.

UNITED STATES PATENT OFFICE.

THOMAS ANTHONY MacDONALD, OF PATERSON, NEW JERSEY.

MOTOR DRIVEN BY WATER-CURRENTS.

SPECIFICATION forming part of Letters Patent No. 737,256, dated August 25, 1903.

Application filed October 4, 1902. Serial No. 125,959. (No model.)

*To all whom it may concern:*

Be it known that I, THOMAS ANTHONY MAC-DONALD, a subject of the King of Great Britain, residing at Paterson, in the county of Passaic and State of New Jersey, have made certain new and useful Improvements in Motors Driven by Water-Currents, of which the following is a specification.

It is the object of my invention to provide an improvement in the class of motors which are adapted for utilizing the force of flowing water by transforming it into electrical energy or for driving machinery of any kind. It is well known to those acquainted with such motors that they have proven generally unsatisfactory for several reasons, and are hence rarely used.

I have devised a motor which avoids the chief defects of its predecessors and contains features which render it superior in various ways.

The construction, arrangement, and operation of parts are as hereinafter described, and shown in the accompanying drawings, (three sheets,) in which—

Figure 1 is a plan view of my improved apparatus, including a rigid support therefor consisting of masonry and woodwork. Fig. 2 is an end view of the parts shown in Fig. 1. Fig. 3 is a vertical section. Fig. 4 is a detail view of an adjustable rigid support for the hinged frame carrying the motor or water-wheels proper. Fig. 5 is another end view, the water-wheels or motors proper not being shown. Fig. 6 is a detail sectional view of the bearing of the hinged frame carrying the water-wheels. Fig. 7 is a perspective view of parts of the bearing detached from each other. Fig. 8 is an end view of the bearing.

X indicates a wall of masonry arranged alongside a stream Y, whose direction of flow is indicated by arrows in Fig. 1.

Z is a wooden frame erected on and rigidly attached to the wall X.

A indicates a series of water-wheels or current-motors which are in practice immersed more or less in the stream Y and which are suitably constructed to utilize the force of the same by rotation. I preferably employ a water-wheel constructed and adapted to operate as shown and described in my Letters Patent No. 442,694, dated December 16, 1890. It is to be understood, however, that any other suitable wheel may be substituted. In the instance here shown three such wheels are employed, the same being keyed upon a shaft B, which is journaled in the lower ends of the three angular fulcrum-bars C. As shown in Figs. 2 and 5, these bars have a long straight portion, their front ends being bent downward at an angle of about forty-five degrees. At a point near the middle of the length of the straight portion the bars C are hinged on a shaft D, which is provided with a pulley E, from which power is taken off by means of a belt. (Shown by dotted lines, Fig. 1.) In place of a belt any other form of gearing may be employed. The rotation imparted to the shaft B by means of the current-motors A is transmitted to the driving-shaft D by means of bevel-gearing F and a shaft G, as illustrated best in Fig. 1. The shaft G is supported and journaled in rigid attachments of one of the angular fulcrum-bars C. The weight of the wheels A and the power-transmitting gearing is nearly counterbalanced by weights H, secured to the rear ends of the fulcrum-bars C. As shown, I employ a series of boxes in which stones or other weights are deposited until the desired counterbalance effect is obtained. By this means I produce an efficient, cheap, and easily-regulated counterbalance. When the fulcrum-bars C rest upon the masonry X, as shown in Figs. 2 and 5, the motor-wheels are completely submerged, and thus the greatest power is obtained. It is apparent, however, that if the wheels be adjusted higher only a portion of them will be immersed, and thereby the power will be lessened correspondingly. For the purpose of raising the wheels A, and thus regulating the power, as required, I employ a wire rope I, which runs on small pulleys J, attached to the frame Z, and is wound upon a windlass K, which may be rotated by a hand-crank L, as shown in Fig. 1. For supporting the operator I provide a footboard M, as there shown.

The fulcrum-bars C are locked in any required adjustment by means of a pawl N, (see Figs. 1 and 5,) which is pivoted to one of the fulcrum-bars and engages a curved rack-bar O, which is secured to the vertical face of the adjacent wall. For the purpose of releasing the pawl when it is required to lower the frames carrying the water-wheels A, I employ a pull-cord P, arranged as shown in Figs. 2 and 5. In Fig. 5 the apparatus is shown by dotted lines thrown up and supported entirely out of action. In order to combine maximum lightness, strength, and rigidity, I provide each of the fulcrum-bars C with a triangular truss-brace C', one of whose sides—to wit, the front—extends to the shaft B and is bolted or riveted to the angular portion of a fulcrum-bar. The rear angle of each brace C' is secured directly in front of a counterbalance H. A strut or brace extends vertically from the apex of the angle of the truss-frame C' to the fulcrum-point of the base-bar C. The several truss-frames C' are connected on the front side by means of a diagonal brace and tie Q and on the rear side by a horizontal tie and brace bar R', arranged as shown in Fig. 1. The several fulcrum-bars C are further connected by means of a horizontal tie-bar R, as further shown in Fig. 1. By this mode of construction and bracing the frame of the apparatus is rendered very strong and rigid; but in order to relieve the shaft D of torsion and friction I employ an antifriction thrust-bearing, the same consisting of a roller S, (see Fig. 5,) which is secured to the lower or downstream fulcrum-bar C and is adapted to run on the segmental or curved rack-bar O.

The hinged connection or bearing of the wheel-frame is constructed and arranged to operate as follows: Each of the fulcrum-bars C is secured to the sleeve T, (see Figs. 6 and 7,) which is supported in vertical bars U, fixed in the wall X. Detachable collars V are applied to the ends of the sleeve T, which project through eyes in the uprights U, as shown in Fig. 6. The shaft D is adapted to rotate freely in the sleeve T and is thus relieved of the friction which would be otherwise caused by the weight of the frame carrying the wheels and counterpoise.

When the wheels A are immersed in the water—in other words, when the fulcrum-bars C are in the position shown in Figs. 2 and 5—the said bars derive a firm support from the masonry wall X. It is desirable that such frame-support shall be also maintained when the wheels are raised, so they are partly immersed in the water, and for this purpose I employ a kind of rack W, such as is shown in Figs. 3 and 4. The same consists of parallel bars set at a slight inclination from the vertical and rigidly fixed in the masonry wall X and provided with a series of movable transverse rods $w$. It is obvious that a rod $w$ is inserted beneath the triangular truss-frame C' to support it any desired elevation, and thus the entire apparatus is practically as rigid as when the fulcrum-bars C rested on the wall X.

The two bevel-wheels which are immersed in the water may be protected by boxing against contact with floating pieces of wood or other material. The length of the wheel-shaft may be also extended, and any desired number of wheels may be placed thereon.

As thus constructed my wheel or motor is distinguished by lightness, strength, cheapness, ease of adjustment for regulating power, and high efficiency in producing power.

Having thus described my invention, what I claim as new, and desire to secure by Letters Patent, is—

1. The combination, with a rigid support and a fulcrum power-shaft, of a wheel-frame comprising a series of fulcrum base-bars extending rearward and provided with counterbalances and also extending forward and downward at an obtuse angle, a motor-shaft, and current-wheels carried at the ends of such fulcrum-bars, triangular truss-braces applied to the fulcrum-bars and connected by rigid braces and ties, gearing connecting the current-wheels with the fulcrum-shaft, and an antifriction thrust-bearing arranged as shown, and the rope, windlass, and pawl and ratchet for raising and locking the frame of the apparatus in the manner shown and described.

2. The combination, with a rigid support and fulcrum power-shaft, wheels, and a pivoted frame carrying said wheels and having a pivoted pawl arranged as shown, of a curved rack-bar fixed on a side support adjacent to said frame, for engagement with the pawl, a pull-rope connected with said pawl and passing backward on suitable guides, and means for raising the wheels, as shown and described.

THOMAS ANTHONY MacDONALD.

Witnesses:
C. W. BENSEN,
WESSELS VAN BLARCOM.